United States Patent [19]
Nishizawa et al.

[11] Patent Number: 5,510,835
[45] Date of Patent: Apr. 23, 1996

[54] VIDEO CAMERA HAVING A SOLID-TYPE IMAGE SENSOR

[75] Inventors: Akihito Nishizawa, Yokosuka; Ryuji Nishimura, Yokohama; Hiroyasu Ohtsubo, Chigasaki, all of Japan

[73] Assignee: Hitachi, Ltd., Tokyo, Japan

[21] Appl. No.: 981,398

[22] Filed: Nov. 25, 1992

[30] Foreign Application Priority Data

Nov. 25, 1991 [JP] Japan ..................................... 3-334470

[51] Int. Cl.$^6$ .................................................. H04N 5/217
[52] U.S. Cl. ............................................. 348/242; 348/273
[58] Field of Search ................................. 358/41, 43, 44, 358/36; 348/241, 242, 250, 248, 251, 252, 272, 273, 255, 256, 257, 234; H04N 9/07, 9/04, 5/217

[56] References Cited

U.S. PATENT DOCUMENTS

| | | | |
|---|---|---|---|
| 4,523,229 | 6/1985 | Kanmoto | 348/251 |
| 4,712,135 | 12/1987 | Hashimoto et al. | 348/241 |
| 4,714,955 | 12/1987 | Nishimura | 358/44 |
| 4,748,499 | 5/1988 | Ueda | 348/241 |
| 4,903,121 | 2/1990 | Uomori et al. | 348/242 |
| 5,043,802 | 8/1991 | Tarumizu | 358/36 |

FOREIGN PATENT DOCUMENTS

| | | | |
|---|---|---|---|
| 170692 | 7/1990 | Japan | H04N 9/07 |
| 139991 | 6/1991 | Japan | H04N 9/07 |

Primary Examiner—James J. Groody
Assistant Examiner—Chris Grant
Attorney, Agent, or Firm—Antonelli, Terry, Stout & Kraus

[57] ABSTRACT

Output signals of a solid state image sensor 1 are processed in a signal processing circuit 3 and then supplied as brightness signals to a variable gain circuit 4, and gain of the circuit is varied for each color separation filter provided in the solid state image sensor 1, and in the case of achromatic objects, signal amounts for each color separation filter are made equal and moiré is suppressed. In such a video camera, a noise reducer circuit 5 is provided and output signals of the variable gain circuit 4 are supplied to the noise reducer circuit 5 and adding processing is carried out during a plurality of horizontal scanning periods neighboring vertically thereby level variation (line pair) of the brightness signals for each horizontal scanning period is suppressed. A vertical resolution correction circuit 6 generates a vertical resolution correction signal from output signals of the signal processing circuit 3 there by degradation of the vertical resolution of the brightness signals is corrected.

5 Claims, 8 Drawing Sheets

ND A SOLID-TYPE
VIDEO CAMERA HAVING A SOLID-TYPE IMAGE SENSOR

FIELD OF THE INVENTION

The present invention relates to a video camera using a solid state image sensor where the solid state image sensor is provided with a plurality of color separation filters in mosaic form being different in spectral sensitivity so that color video signals can be obtained, and more particularly relates to a video camera which can suppress false signals mixed with the obtained color video signals.

BACKGROUND OF THE INVENTION

As for a video camera using solid state image sensors in an image pickup part, there are a multi plate type using a plurality of solid state image sensors and a single plate type using a solid state intake sensor. In the video camera of single plate type, color separation filters in mosaic form are mounted on the solid state image sensor, and color signals for each color separation filter obtained from the solid state image sensor are processed whereby brightness signals and color difference signals are formed.

In such a video camera of single plate type using a solid state image sensor, however, since sampling density of each color signal obtained from the solid state image sensor becomes low in comparison with that for multi plate type, a false signal caused by high frequency components shifting to the low range, that is, moiré becomes greater and therefore the picture quality of reproduced images is degraded.

As a method in the prior art to suppress moiré occurring on brightness signals, for example, the method disclosed in Japanese patent application laid-open No. 170692/1990 is well known, where circuits being different in signal gain for each color signal to respective color separation filters are provided, and the signal gain of respective circuits is set so that the signal amounts of respective color signals become equal for achromatic objects. That is, as the signal amount of each color signal becomes equal, occurrence of frequency components due to the arrangement of the color separation filters can be prevented. As a consequence, moiré occurring in brightness signals can be suppressed.

But, if signal gains of a circuit differ for each color signal obtained by color separation filters as in the prior art as above described, a problem exists in that since combinations of color signals on the signals outputted from the solid state image sensors differ between the horizontal scanning periods of nth line and (n+1)th line, the difference of the ratio of R(red), G(green), B(blue) constituting the brightness signals appears between the horizontal scanning periods of the nth line and the (n+1)th line, and the brightness level varies for each horizontal scanning period in the case of image pickup of the chromatic objects.

For example, in the CCD image sensor of picture element mixing type where two upper and lower picture elements are mixed and read out, using a color separation filter shown in FIG. 2 as a color separation filter, if the ratio of R, G and B is made R:G:B=3:3:1 and signal gains for respective circuits are set so that signal amounts of four kinds of Color signals G+Cy, Mg+Ye, Mg+Cy and G+Ye corresponding to each color separation filter become equal to achromatic objects, signal gains for respective color signals are 10/7, 1, 10/8 and 10/9. Then levels of brightness signals for a horizontal scanning period composed of two kinds of color signals G+Cy and Mg+Ye arranged in dot sequential order, become approximately 2R+3.866+2.43B, and levels of brightness signals for a next horizontal scanning period composed of color signals Mg+Vy and G+Ye arranged in dot sequential order, become approximately 2.36R+3.47G+2.5B, and levels of brightness signals for every horizontal scanning period change to chromatic objects (hereinafter referred to as "line pair").

SUMMARY OF THE INVENTION

An object of the present invention is to solve such a problem and to provide a video camera having little moiré by eliminating difference of levels of brightness signals between the horizontal scanning periods. In order to attain the foregoing object, the present invention is provided with a video camera comprising:

a) a color image sensor having a planar array of solid state light-sensitive elements, and a color separation filter mosaic made up of individual color filter elements arranged in one-to-one position on said light-sensitive elements and in repeating predetermined color patterns in line and vertical directions, and outputting different light-sensed signals in response to a line scan of said planar array;

b) a chroma signal generator for processing light-sensed signals from said color image sensor to generate chroma signals; and c) a lumina signal generator having:
  i) level equalizing means for equalizing the levels of said light-sensed signals from said color image sensor;
  ii) adding means for adding level-equalized light-sensed signals in one line of said planar array and other level-equalized light-sensed signal in another line adjacent to said one line to produce an added signal; and
  iii) vertical resolution conversion means for generating a vertical resolution correction signal responsive to a vertical correction of said light-sensed signals between said one and another lines of said planar array and correcting said added signal by said correction signal to produce a lumina signal.

DESCRIPTION OF THE PREFERRED EMBODIMENTS

Embodiments according to the present invention will be described by the accompanying drawings as follows.

Figures 1, 2:
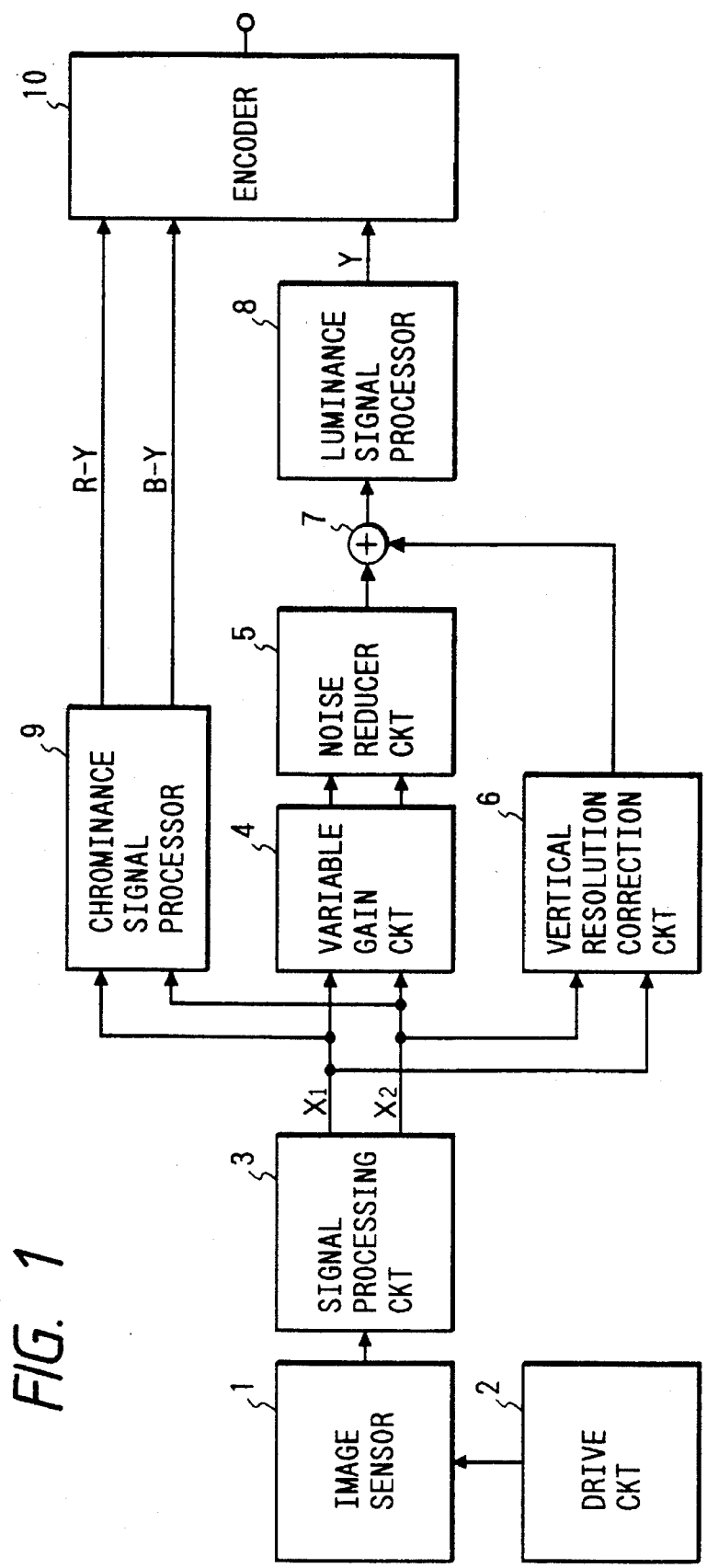
FIG. 1 is a block diagram indicating an embodiment of a video camera according to the present invention.
FIG. 2 is a diagram indicating an embodiment of a color separation filter to be used for a solid state image sensor of a video camera in FIG. 1.

FIG. 1 is a block diagram indicating an embodiment of a video camera according to the present invention. In FIG. 1, numeral 1 designates a solid state image sensor, numeral 2 designates a drive circuit, numeral 3 designates a signal processing circuit, numeral 4 designates a variable gain circuit, numeral 5 designates a noise reducer circuit, numeral 6 designates a vertical resolution correction circuit, numeral 7 designates an adding circuit, numeral 8 designates a luminance signal processor, numeral 9 designates a chrominance signal processor, and numeral 10 designates an encoder. In FIG. 1, an output signal of the solid state image sensor 1 being driven by the drive circuit 2 with a plurality of different color separation filters provided in a mosaic state as indicated in FIG. 2 for example, is a dot sequential signal composed of a signal ((G+Cy) signal) due to the color separation filters G, Cy and a signal ((Mg+Ye) signal) due to the color separation filters Mg, Ye for nth line, and is a dot sequential signal composed of a signal (Mg+Cy) and a signal (G+Ye) for next (n+1)th line.

Such a signal is subjected to suitable processings such as amplification in the signal processing circuit 3, and then supplied as a composite signal X1 for nth line and as a composite signal X2 for (n+1)th line, to the chrominance signal processor 9, the variable gain circuit 4 and the vertical resolution correction circuit 6. In the chrominance signal processor 9, the output composite signals X1, X2 of the signal processing circuit 3 are separated into color signals for each of the color separation filters G, Cy, Mg and Ye provided in thee solid state image sensor 1, and two color difference signals (R-Y, B-Y) are generated by operating on each color signal being obtained. These color difference signals (R-Y, B-Y) are supplied to the encoder 10.

The variable gain circuit 4 controls gains of the output composite signals X1, X2 of the signal processing circuit 3 per each of signals (G+Cy), (Mg+Ye), (Mg+Cy) and (G+Ye) due to the color separation filters, thereby moiré suppression processing is carried out to the signals X1 and X2 as disclosed in Japanese patent application laid-open No. 170692/1990. Each output signal of the variable gain circuit 4 is supplied to the noise reducer circuit 5, where the two composite signals X1, X2 subjected to moiré suppression are added. Here, these composite signals X1, X2 are two adjacent signals, and Z a brightness signal with noise suppressed can be obtained by adding these signals.

Then, the above-mentioned adding processing causes the degradation of the vertical resolution of brightness signals. Therefore, the vertical resolution correction circuit 6 generates a vertical resolution correction signal from the output composite signals X1, X2 of the signal processing circuit 3, and the vertical resolution correction signal is added to the brightness signal outputted from the noise reducer circuit 5 in the adding circuit 7 thereby the brightness signal with vertical resolution corrected cart be obtained. The brightness signal is subjected to proper processings such as gamma processing in the luminance signal processor 8, and then supplied to the encoder 10. In the encoder 10, a color video signal is generated from the brightness signal and color difference signals (R-Y, B-Y) derived from the chrominance signal processor 9.

Thus, in this embodiment, as color signals for each color separation filter of the signals outputted from the solid state image sensor 1 are subjected to gain control in the variable gain circuit 4, moiré occurring in the brightness signal can be suppressed, and also as adding processing during a plurality of horizontal scanning periods neighboring vertically is carried out in the noise reducer circuit 5, the brightness level changes (line pair) for each horizontal scanning period attendant on the moiré suppression processing can be reduced. Moreover, as a vertical resolution correction signal is generated from composite signals X1, X2 during the horizontal scanning periods neighboring vertically from the signal processing circuit 3 by the vertical resolution correction circuit 6, and is added to the brightness signal outputted from the noise reducer circuit 5, the vertical resolution degradation due to the adding processing during the horizontal scanning period being carried out in the noise reducer circuit 5 can be also corrected. Consequently, moiré occurring in the brightness signal can be suppressed without producing a line pair in chromatic objects and the vertical resolution degradation.

Figure 3:
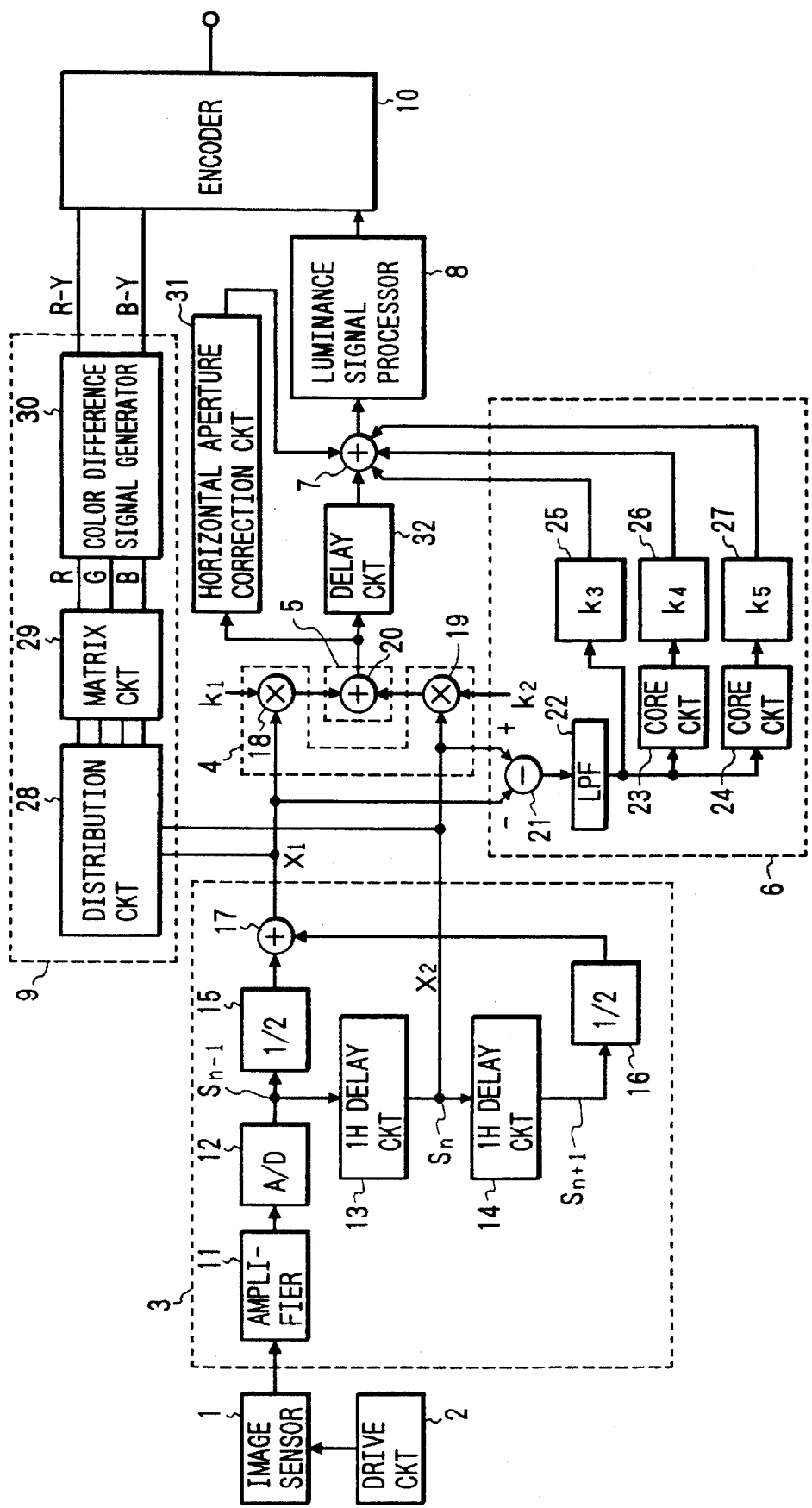
FIG. 3 is a block diagram indicating another embodiment of a video camera according to the present invention.

FIG. 3 is a block diagram indicating another embodiment of a video camera according to the present invention. In FIG. 3, numeral 11 designates an amplifier, numeral 12 designates an A/D converter, numerals 13, 14 designate 1It delay circuits (where 1H is one horizontal scanning period), numerals 15, 16 designate coefficient circuits, numeral 17 designates an adding circuit, numerals 18, 19 designate multiplying circuits, numeral 20 designates an adding circuit, numeral 21 designates a subtracting circuit, numeral 22 designates an LPF (a low pass filter), numerals 23, 24 designate core circuits, numerals 25–27 designate coefficient circuits, numeral 28 designates a distribution circuit, numeral 29 designates a matrix circuit, numeral 30 designates a color difference signal generator, numeral 31 designates a horizontal aperture correction circuit, numeral and numeral 32 designates a delay circuit. Parts in FIG. 3 corresponding to those in FIG. 1 are marked by the same numerals.

In FIG. 3, the above-mentioned dot sequential signals outputted from the solid state image sensor 1 are supplied to the signal processing circuit 3. In the signal processing circuit 3, the output signal supplied from the solid state image sensor 1 is amplified by the amplifier 11 and then converted into a digital signal $S_{n-1}$ by the A/D converter 12. The digital signal $S_{n-1}$ is supplied to the coefficient circuit 15 and attenuated to ½ and is also delayed by the 1H delay circuits 13, 14, in each 1H, totally 2H. An output signal $S_{n+1}$ of the 1H delay circuit 14 is supplied to the coefficient circuit 16 and attenuated to ½. Output signals of the coefficient circuits 15, 16 are added in the adding circuit 17 thereby a first composite signal X1 can be obtained. An output signal Sn of the 1H delay circuit 13 is a second composite signal X2. Accordingly, the composite signal X1 is an average, signal of the signals over the two horizontal scanning periods separated by two horizontal scanning periods, and the composite signal X2 is a signal of the horizontal scanning period next to the composite signal X1.

These composite signals X1, X2 are together supplied to the color signal generator 9, the variable gain circuit 4 and the vertical resolution correction circuit 6. The chrominance signal processor 9 is constituted by the distribution circuit 28, the matrix circuit 29 and the color difference signal generator 30, and the composite signals X1, X2 from the signal processing circuit 3 are supplied to the distribution circuit 28 and distributed to color signals for each of the color separation filters G, Cy, Mg and Ye provided in the solid state image sensor 1 and supplied respectively to the matrix circuit 29. In the matrix circuit 29, these color signals are processed by calculation and the primary color signals R, G, B are generated. These primary color signals R, G and B are supplied to the color difference signal generator 30 and subjected to proper processings such as white balance, and then two color difference signals (R-Y, B-Y) are generated. These color difference signals (R-Y, B-Y) are supplied to the encoder 10.

The variable gain circuit 4 is composed of the multiplying circuits 18, 19, and the composite signal X1 from the signal processing circuit 3 is supplied to the multiplying circuit 18 and! multiplied by coefficient k1, and also the composite signal X2 from the signal processing circuit 3 is supplied to the multiplying circuit 19 and multiplied by coefficient k2. The coefficient k1 is different for each of signals (G+Cy), (Mg+Ye) in the composite signal X1, and the coefficient k2 is different for each of signals (Mg+Cy), (G+Ye) in the composite signal X2. The above-mentioned gain control is carried out to these signals (G+Cy), (Mg+Ye), (Mg+Cy) and (G+Ye), and moiré suppression processing is done to the composite signals X1 and X2. The output signals of the multiplying circuits 18, 19 are brightness signals for the neighboring horizontal scanning periods, and are added in the adding circuit 20 constituting the noise reducer circuit 5, thereby the noise is reduced and also the line pair is eliminated simultaneously.

The brightness signal outputted from the noise reducer circuit 5 is delayed by the delay circuit 32 and then is supplied to the adding circuit 7, and it is also supplied to the horizontal aperture correction circuit 31 thereby a horizontal profile correction signal is generated. The horizontal profile correction signal is added in the adding circuit 7 to the brightness signal from the delay circuit 32. Thus, the horizontal resolution is compensated.

Moreover, the delay circuit 32 is used to adapt the delay time for the horizontal aperture correction circuit 31 and the vertical resolution correction circuit 6.

The vertical resolution correction circuit 6 is composed of the subtracting circuit 21, the LPF 22, the core circuits 23, 24, and the coefficient circuits 25-27. The composite signal X1 is subtracted in the subtracting circuit 21 from the composite signal X2 derived from the signal processing circuit 3, and the high frequency component to constitute the difference between the composite signals X2 and X1 is extracted thereby the vertical resolution correction signal is generated. The vertical resolution correction signal after eliminating its unnecessary high frequency components through the LPF 22, is supplied to the coefficient circuit 25 and multiplied by the coefficient k3. The vertical resolution correction signals are supplied to the core circuits 23, 24 and signal components less than a definite level are eliminated, and then the coefficients k4, k5 are multiplied in the coefficient circuits 26, 27 respectively. Vertical resolution correction signals outputted from these coefficient circuits 25-27 are supplied to the adding circuit 7 and added to the brightness signal from the delay circuit 32. The output signal of the adding circuit 7 is supplied to the luminance signal processor 8, and the signal being subjected to correction processings such as gamma processing is supplied to the encoder 10.

Thus in this embodiment, gains of color signals for each color separation filter provided on the solid state image sensor 1 are controlled by the multiplying circuits 18, 19, thereby moiré occurring in the brightness signal is suppressed and the adding processing for a plurality of horizontal scanning periods neighboring vertically is carried out in the adding circuit 20. Consequently, the line pair attendant on the moiré is suppressed. Also, as the vertical correction signal is generated by the subtracting circuit 21 from the sum signal X1 between the original signal before being subjected to the signal gain control for each color separation filter and the original signal being delayed by the two horizontal scanning periods and from the signal X2 as a result of the original signal being delayed by one horizontal scanning period, and operation is carried out so as to correct the vertical resolution degradation due to the adding processing during the horizontal scanning period, the moiré occurring in the brightness signal of the video camera can be suppressed without producing the vertical resolution degradation and the line pair in chromatic objects.

Moreover, in order to elevate the moiré suppression effects occurring in the brightness signals, the multipliers k1, k2 off the multiplying circuits 18, 19 can be set freely from the outside for each horizontal scanning line and in response to the color temperature of the light source or color of the objects.

Further in this embodiment, the output signal of the subtracting circuit 21 passes through the LPF 22 thereby the correction quantity of the vertical resolution can be changed in response to the frequency components of the vertical resolution correction signal, and as vertical resolution correction signals are composed of output signals of the LPF 22 and signals by eliminating signal components less than the definite level from the output signals in the core circuits 23, 24 and the correction quantity of the vertical resolution is changed in response to the level of the vertical resolution correction signal, the noise and the moiré in the vertical resolution correction signals are removed, and the vertical resolution due to the adding processing in the adding circuit 7 can be improved and also the vertical aperture correction of the solid state image sensor 1 can be carried out simultaneously.

Figure 4:
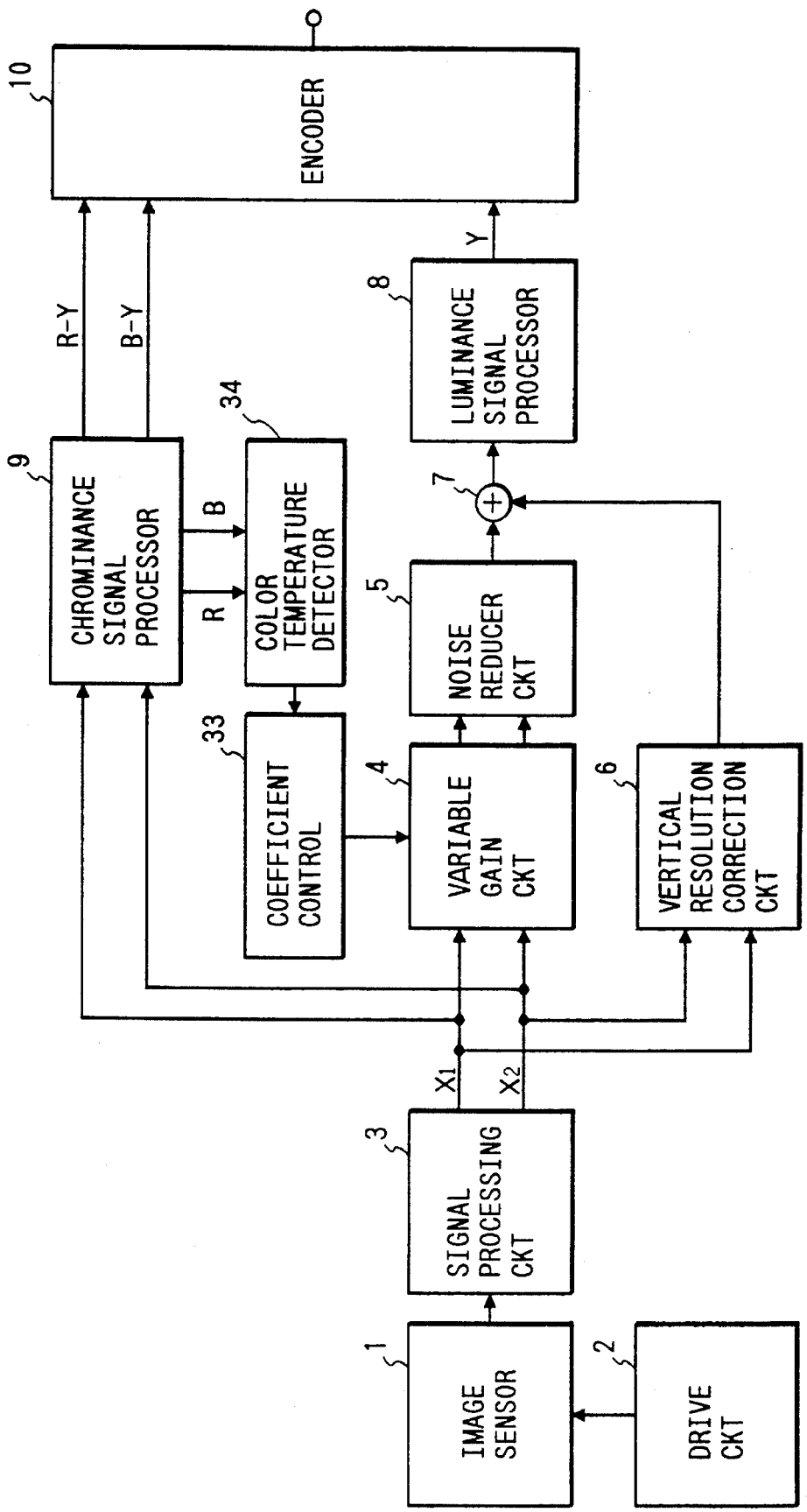
FIG. 4 is a block diagram indicating still another embodiment of a video camera according to the present invention.

FIG. 4 is a block diagram indicating another embodiment of a video camera according to the present invention, where numeral 33 designates a matrix coefficient control circuit, and numeral 34 designates a color temperature detector, and parts corresponding to FIG. 1 are marked with the same numerals and the redundant explanation shall be omitted.

In the embodiment shown in FIG. 1, signal gain of the variable gain circuit 4, that is, matrix coefficient of each picture element (corresponding to coefficients k1, k2 in FIG. 3) is constant for color temperature, but in this embodiment, such coefficient can be optimized in response to the color temperature change.

In FIG. 4, the color temperature detector 34 detects the color temperature by searching the ratio of the primary color signals R, B before the white balance adjustment being produced in the chrominance signal processor 9. The matrix coefficient control circuit 33 determines the optimal matrix coefficient corresponding to the color temperature detected in the color temperature detector 34, and supplies this to the variable gain circuit 4. Optimization of real, fix coefficients is carried out as follows.

Composite signals Xn, X(n+1) for the nth horizontal scanning period and the (n+1)th horizontal scanning period can be expressed by following equations.

$$Xn = Kwb \cdot Wb + Kgr \cdot Gr \qquad (1)$$

$$X(n+1) = Kgb \cdot Gb + Kwr \cdot Wr \qquad (2)$$

Where, Wb, Gr, Gb and Wr represent picture element-mixed signals Mg+Cy, G+Te, G+Cy and Mg+Ye respectively, and Kwb, Kgr, Kgb and Kwr represent matrix coefficients of respective signals. If signal amounts of color signals Wb, Gr, Gb and Wr are represented by Wb0, Gr0, Gb0 and Wr0 for achromatic objects at a color temperature T, and these matrix coefficients are determined so that the relation $$Kwb:Kgr:Kgb:Kwr= 1/Wb0:1/Gr0:1/Gb0:1/Wr0 \quad (3)$$

may be satisfied, then, the moiré can be suppressed, for example, as described in the previously mentioned Japanese patent application laid-open No. 170692/1990. However, as the right-hand side of equation (3) varies in response to the color temperature T, the optimal matrix coefficient varies with the color temperature T. Therefore, in this embodiment, a set of optimal matrix coefficients for each color temperature T is held to the matrix coefficient control circuit 33, and a set of optimal matrix coefficients Kwb, Kwr, Kgb and Kwr is selected corresponding to the detection results of the color temperatures by the color temperature detector 34 and given to the variable gain circuit 4. In the variable gain circuit 4, dot sequential signals of two systems constituted by signals Wb, Gr or signals Gb, Wr are multiplied by the matrix coefficients supplied from the matrix coefficient control circuit 33, thereby the operations of equations (1), (2) are carried out. Thus, in this embodiment, even; if the color temperature of objects varies, as the matrix coefficient can be optimized in response to the variation, the reproduced picture of high quality with little moiré can be always obtained.

Figure 5:
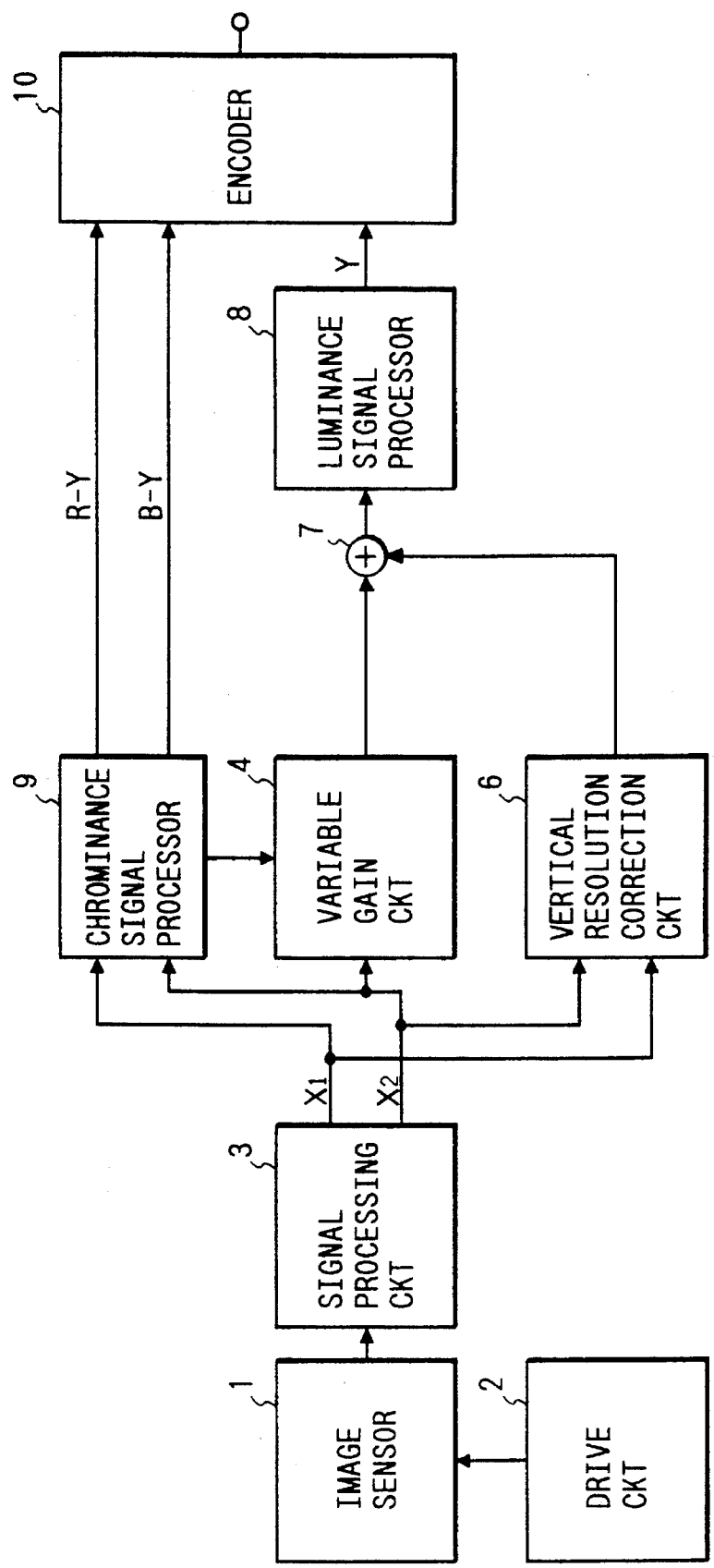
FIG. 5 is a block diagram indicating still another embodiment of a video camera according to the present invention.

FIG. 5 is a block diagram indicating still another embodiment of a video camera according to the present invention, where parts corresponding to FIG. 4 are marked with the same numerals and the redundant explanation shall be omitted.

As shown in FIG. 5, this embodiment has the same constitution as that indicated in FIG. 4 except the noise reducer circuit 5.

In FIG. 5, the signal processing circuit 3 outputs two composite signals X1, X2 in similar manner to the signal processing circuit 3 in FIG. 3. The variable gain circuit 4 is supplied with the composite signal X2 only, and matrix coefficients are controlled by the chrominance signal processor 9.

Figure 6:
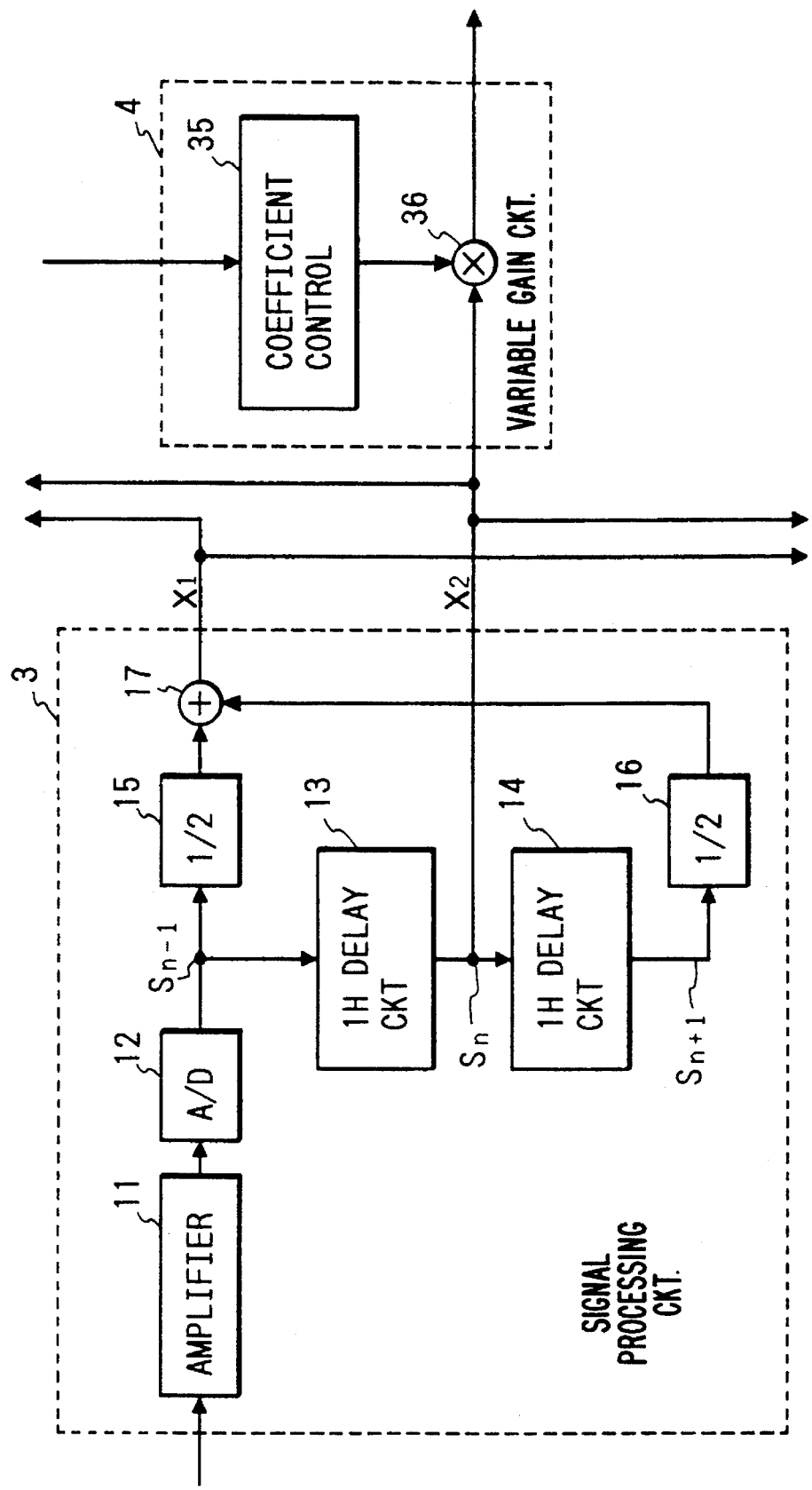
FIG. 6 is a block diagram indicating an embodiment of a signal processing circuit and a variable gain circuit in FIG. 5.

FIG. 6 indicates a concrete constitution for the signal processing circuit 3 and the variable gain circuit 4 in FIG. 5. In FIG. 6, the signal processing circuit 3 has the same constitution as the signal processing circuit 3 in FIG. 3, and the variable gain circuit 4 is constituted by the matrix coefficient control circuit 35 and the multiplying circuit 36. The composite signal X2 outputted from the 1H delay circuit 3 is supplied to the multiplying circuit 36 of the variable gain circuit 4, and is multiplied by matrix; coefficients from the matrix coefficient control circuit 35.

Here, a line pair does not occur in the case of achromatic objects but appears conspicuously only at the primarily colored objects. In this embodiment, regarding the part exceeding the definite saturation degree where the line pair appears conspicuously, the line pair is eliminated by set, ting the variable gain circuit 4 to one-to-one matrix where each matrix coefficient becomes Kwb:Kgr= Kgb=Kwr=1, and regarding other pacts where the moiré becomes rather remarkable, the moiré is suppressed in such a way that matrix coefficients conform which the above-mentioned equation (3). That is, matrix coefficients are formed by the matrix coefficient control circuit 35, in response to the magnitude of one color difference signal (for example, color difference signal R-Y) generated in the chrominance signal processor 9 (FIG. 5), so that the matrix coefficients become 1 at the time of high saturation degree, and conform with the equation (3) at the other time.

Thus, in this embodiment, when the color saturation degree is high, the variable gain circuit 4 is set to one-to-one matrix, thereby line pairs can be prevented in a simple circuit constitution.

Figure 7:
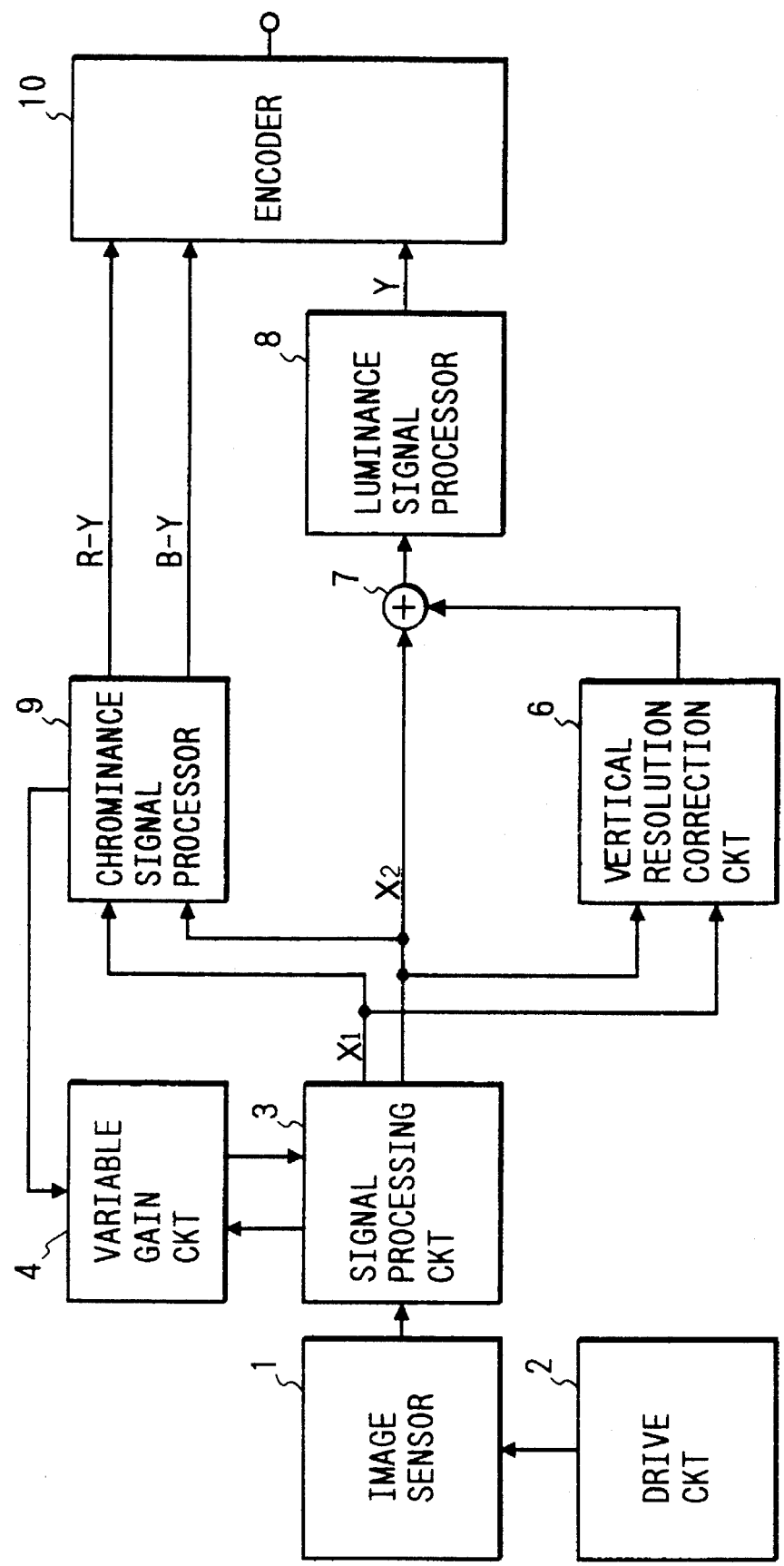
FIG. 7 is a block diagram indicating still another embodiment of a video camera according to the present invention.

FIG. 7 is a block diagram indicating still another embodiment of a video camera according to the present invention, and parts corresponding to FIG. 5 are marked with the same numerals and the redundant explanation shall be omitted.

In the embodiment shown in FIG. 5, the variable gain circuit 4 processes the output composite signal X2 of the signal processing circuit 3, but in this embodiment, as shown in FIG. 7, the signal on the way of processing in the signal processing circuit 8 is processed in the variable gain circuit 4, and the output signal is returned again to the signal processing circuit 8.

Figure 8:
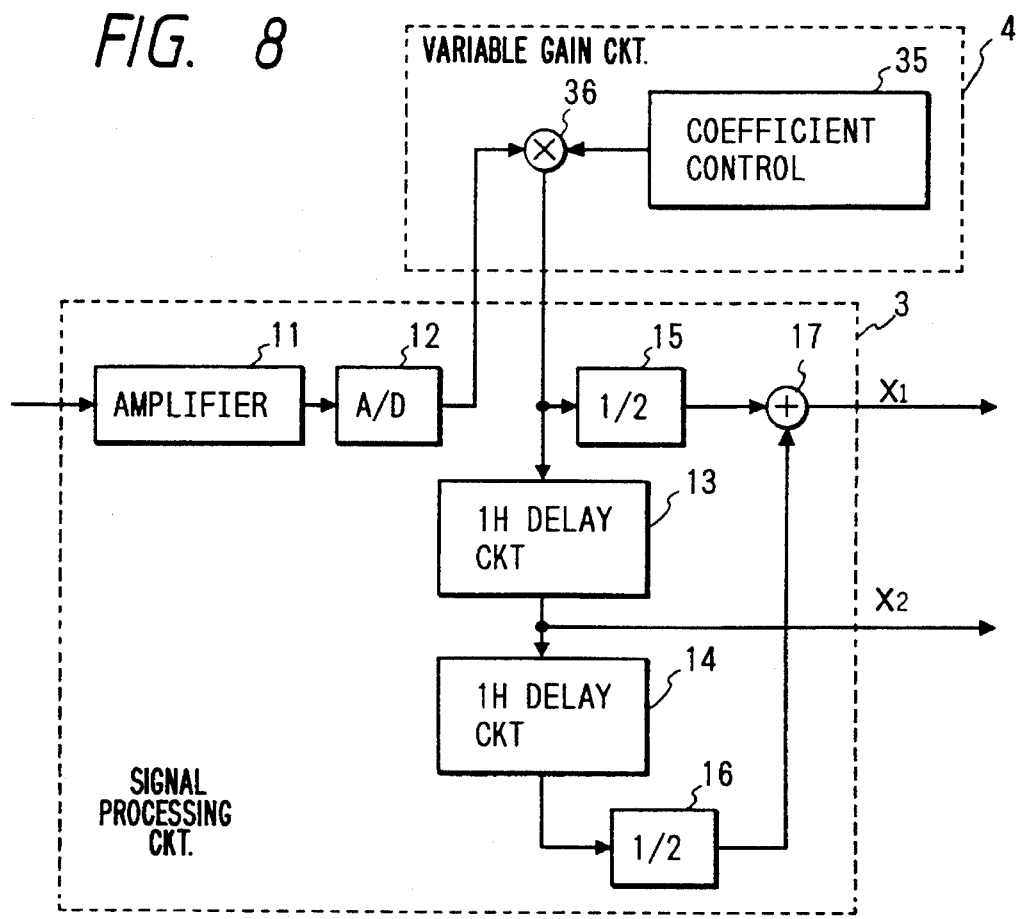
FIG. 8 is a block diagram indicating an embodiment of a signal processing circuit and a variable gain circuit in FIG. 7.

This point will be explained more concretely referring to FIG. 8. In FIG. 8, parts corresponding to FIG. 6 are marked with the same numerals and the redundant explanation shall be omitted.

In FIG. 8, the output signal of the A/D converter 12 is once supplied to the variable gain circuit 4 and multiplied by matrix coefficients from the matrix coefficient control circuit 35 in the multiplying circuit 36, and then the multiplied signal is supplied again to the signal processing circuit 3 and the remaining processing is carried out.

Operation of the matrix coefficient control circuit 35 is similar to that of the matrix coefficient control 35 in FIG. 6, and this embodiment can obtain similar effects to that of the embodiment shown in FIG. 5. Moreover, as the moiré is suppressed by optimizing matrix coefficients to the signal before the 1H delay processing in the signal processing circuit 3, the moiré in the high frequency components in the vertical direction of the brightness signal produced in the vertical resolution correction circuit 6 can also be suppressed to some degree.

Figure 9:
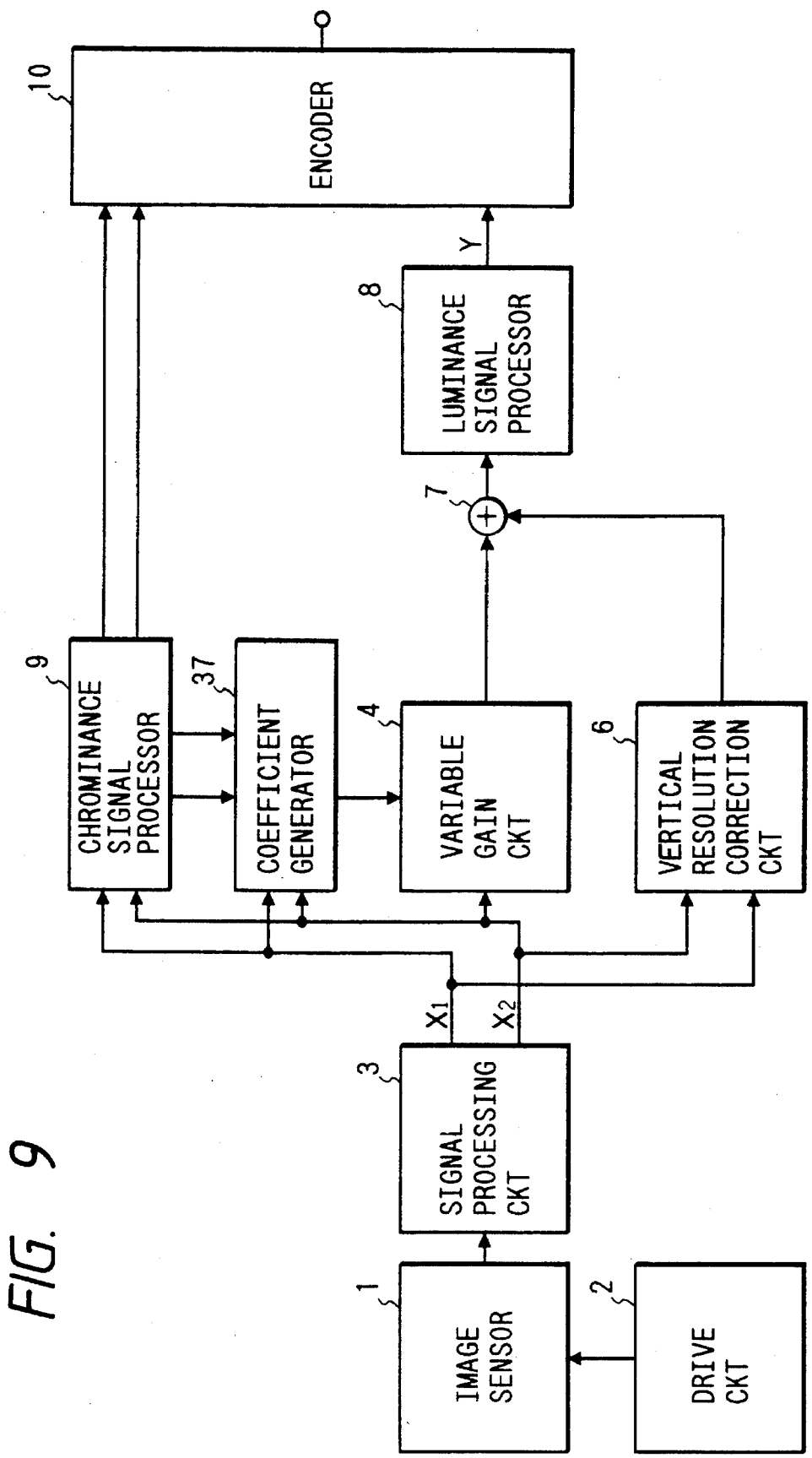
FIG. 9 is a block diagram indicating still another embodiment of a video camera according to the present invention.

FIG. 9 is a block diagram indicating still another embodiment of a video camera according to the present invention, and numeral 37 designates a matrix coefficient generator, and parts corresponding to FIG. 5 are marked with the same numerals and the redundant explanation shall be omitted.

This embodiment corrects matrix coefficients by real time regarding each section of the picture plane. As indicated in FIG. 9, the matrix coefficient generator 37 is provided, thereby matrix coefficients are produced from signals of the chrominance signal processor 9 and corrected by the composite signals X1, X2 from the signal processing circuit 3.

One concrete example of the matrix coefficient generator 37 will be explained referring to FIG. 10 which performs a level equalizing operation. Where numerals 38–43 designate LPF, numeral 44 designates a multiplexer, numeral 45 designates an adding circuit, and numeral 46 designates a dividing circuit.

Figure 10:
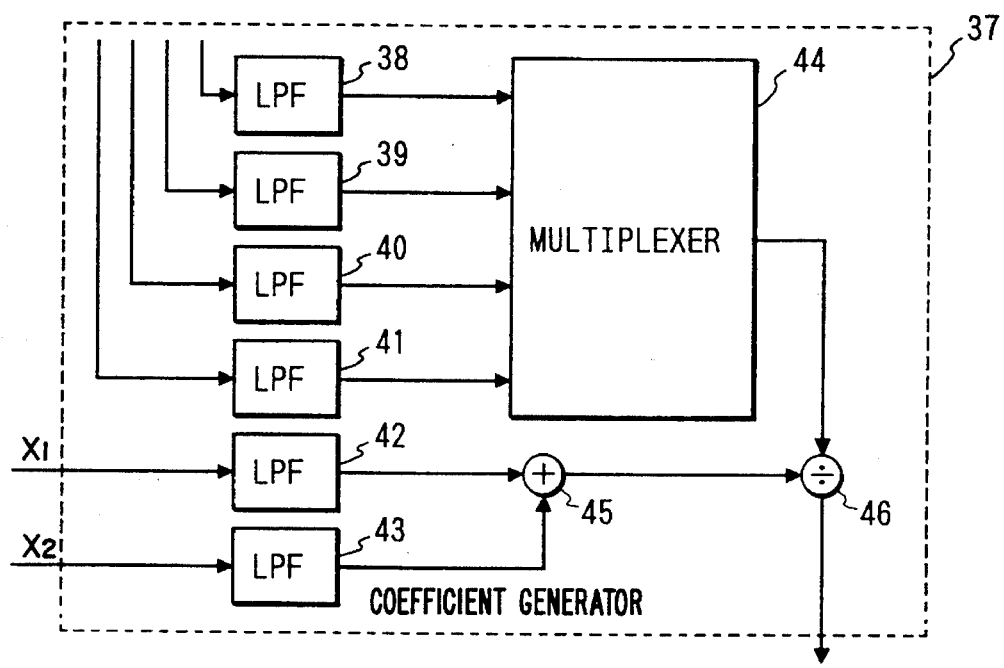
FIG. 10 is a block diagram indicating an embodiment of a matrix coefficient generator in FIG. 9.

In FIG. 10, the composite signals X1, X2 from the signal processing circuit 3 (FIG. 9) having similar constitution to FIG. 3 are supplied to the LPF 42, 43 respectively, and the low frequency components are extracted and added in the adding circuit 45. The output signals of the adding circuit 45 are low frequency components of average of the brightness signals between lines. Also, the chrominance signal processor 9 in FIG. 9 has similar constitution to that of the chrominance signal processor 9 shown in FIG. 3, and signals for each color separation filter obtained from the distribution circuit 28 (FIG. 3) are supplied to the LPF 38–41 respectively, and their low frequency components are extracted and returned to dot sequential signal again by the multiplexer 44. The dot sequential signal is a mean value signal of each picture element signal.

The mean value of the brightness signals outputted from the adding circuit 45 is divided by the mean value of each picture element signal being outputted from the multiplexer 44 by the dividing circuit 46, and the output of the dividing circuit 46 becomes the searched matrix coefficient. Such matrix coefficient satisfies the relation of the equation (3) if the picture element unit of the picture plane.

As above described, in this embodiment, as the moiré can be suppressed not only in achromatic objects but also in objects with high colour saturation degree and line pairs do not occur, the ideal picture quality can be realized.

What is claimed is:

1. A color video camera which is provided with a plurality of color separation filters being different in spectral sensitivity, and with an image pickup section mixing and outputting respective color signals generated from said color separation filters in different combinations for each horizontal scanning, said color video camera comprising:

first means for controlling signal amounts of each color signal corresponding to respective color separation filters of output signals of said image pickup section respectively;

second means for adding the output signals of said first means during neighboring horizontal scanning periods; and third means for generating a vertical resolution correction signal from the input signals of said first means, and for correcting degradation of the vertical resolution of output signals of said second means being attendant on processing of said second means;

wherein said third means serves also as vertical aperture correction means of output signals of said image pickup section.

2. A color video camera which is provided with a plurality of color separation filters being different in spectral sensitivity, and with an image pickup section mixing and outputting respective color signals generated from said color separation filters in different combinations for each horizontal scanning, said color video camera comprising:

first means for controlling signal amounts of each color signal corresponding to respective color separation filters of output signals of said image pickup section respectively;

second means for adding the output signals of said first means during neighboring horizontal scanning periods; and third means for generating a vertical resolution correction signal from the input signals of said first means, and for correcting degradation of the vertical resolution of output signals of said second means being attendant on processing of said second means;

wherein said third means corrects degradation of the vertical resolution of the output signals of said second means in correction coefficients in response to a level of the vertical resolution correction signal.

3. A color video camera which is provided with a plurality of color separation filters being different in spectral sensitivity, and with an image pickup section mixing and outputting respective color signals generated from said color separation, filters in different combinations for each horizontal scanning, said color video camera comprising:

first means for controlling signal amounts of each color signal corresponding to respective color separation filters of output signals of said image pickup section respectively;

second means for adding the output signals of said first means during neighboring horizontal scanning periods; and third means for generating a vertical resolution correction signal from the input signals of said first means, and for correcting degradation of the vertical resolution of output signals of said second means being attendant on processing of said second means;

wherein said third means corrects degradation of the vertical resolution of the output signals of said second means in correction coefficients of the vertical resolution correction signals.

4. A color video camera which is provided with a plurality of color separation filters being different in spectral sensitivity, and with an image pickup section mixing and outputting respective composite signals generated from said separation filters in different combinations for each horizontal scanning, said color video camera comprising:

first means for controlling signal amounts of each composite signal corresponding to respective color separation filters of output signals of said image pickup section respectively according to control coefficients; and second means for generating said control coefficients according to levels of said composite signals separated by said color composite separation filters for correcting each composite signal in said first means on a real time basis.

5. A color video camera which is provided with a plurality of color separation filters being different in spectral sensitivity, and with an image pickup section mixing and outputting respective composite signals generated from said separation filters in different combinations for each horizontal scanning, said color video camera comprising:

first means for generating control coefficients according to levels of said composite signals separated by said composite separation filters, respectively; and second means for multiplying said composite signals by said corresponding control coefficients for each element of said color separation filters.

* * * * *